(12) United States Patent
Mrasek (10) Patent No.: US 7,496,093 B2
(45) Date of Patent: Feb. 24, 2009

(54) SLAVE CIRCUIT AND METHOD FOR INITIALIZING A SLAVE CIRCUIT

(75) Inventor: Armin Mrasek, München (DE)

(73) Assignee: Infineon Technologies AG, Munich (DE)

( * ) Notice: Subject to any disclaimer, the term of this patent is extended or adjusted under 35 U.S.C. 154(b) by 1176 days.

(21) Appl. No.: 10/763,527

(22) Filed: Jan. 23, 2004

(65) Prior Publication Data

US 2004/0184476 A1 Sep. 23, 2004

(30) Foreign Application Priority Data

Feb. 7, 2003 (DE) ................................ 103 05 080

(51) Int. Cl.
*H04L 12/28* (2006.01)
(52) U.S. Cl. ........................... 370/389; 370/392; 326/38
(58) Field of Classification Search ................. 370/389, 370/392; 326/38
See application file for complete search history.

(56) References Cited

U.S. PATENT DOCUMENTS 4,660,141 A 4/1987 Ceccon et al. ............... 364/200
6,185,217 B1 * 2/2001 Ando et al. .................. 370/403

FOREIGN PATENT DOCUMENTS

DE 1904021 A1 4/1997
DE 19740306 A1 9/1997

* cited by examiner

*Primary Examiner*—Daniel J Ryman
*Assistant Examiner*—Dinesh Goel
(74) *Attorney, Agent, or Firm*—Jenkins, Wilson, Taylor & Hunt, P.A.

(57) ABSTRACT

Slave circuit having a data transmission interface (2) for processing data frames; an address register (10) for storing an address; a comparator (13) for comparing the address stored in the address register (10) with an address transmitted to the data transmission interface (2) in a data frame; an indicator register (16) which indicates the initialization of the slave circuit (1) if the address transmitted to the data transmission interface (2) in the slave circuit (1) is identical to a predetermined initialization address (UIA) for the slave circuit (1).

10 Claims, 6 Drawing Sheets

SLAVE CIRCUIT AND METHOD FOR INITIALIZING A SLAVE CIRCUIT

TECHNICAL FIELD

The invention relates to a slave circuit which can be initialized by a master circuit.

BACKGROUND ART

Figure 1:
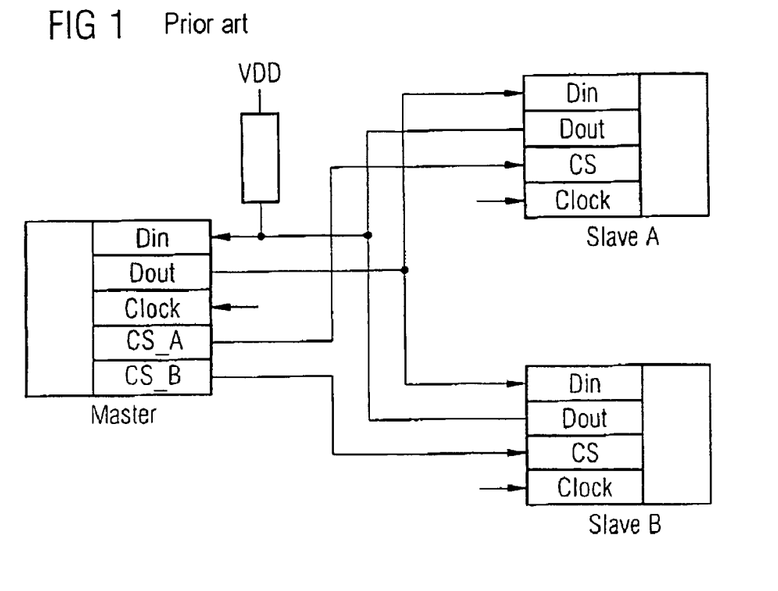
FIG. 1 shows a master/slave circuit arrangement based on the prior art.

FIG. 1 shows a circuit arrangement based on the prior art, where a master circuit is connected to two slave circuits in a star shape. Unlike the master circuit, the slave circuits have no processor for executing a stored program. The data output of the master circuit ($D_{out}$) is connected to the data inputs ($D_{in}$) of the slave circuit A, B by means of a first data bus. The data outputs of the slave circuit Slave A, Slave B are connected to the data input of the master circuit by means of a further data bus. The data lines can be a single data line for serial data transmission or a data bus for parallel data transmission. In the circuit arrangement shown in FIG. 1, the master uses a respective chip selection line (Chip Select) to select a slave circuit for data transmission. A slave circuit is selected by the master circuit using said slave circuit's associated selection line for the purpose of reading data or for writing data. Optionally, "pull up" resistors can be provided on the data lines routed to the data input $D_{in}$ of the master circuit. The pull up resistors provided on the data output lines of the slave circuits allow operation with open drain output drivers, which prevents damage when various slave circuits simultaneously transmit different data on a data line to the master circuit.

In the case of the circuit arrangement shown in FIG. 1, an independent chip select line is provided for each slave circuit Slave A, Slave B. In an alternative embodiment, the master circuit outputs an address signal via an address bus which is connected to a decoding circuit. The address bus transmits, by way of example, an 8 bit address from the master circuit to the decoding circuit, which sends 256(=$2^8$) different chip select signals therefrom to a maximum of 256 different slave circuits. Such a separate decoding circuit is also referred to as "glue logic".

Figure 2:
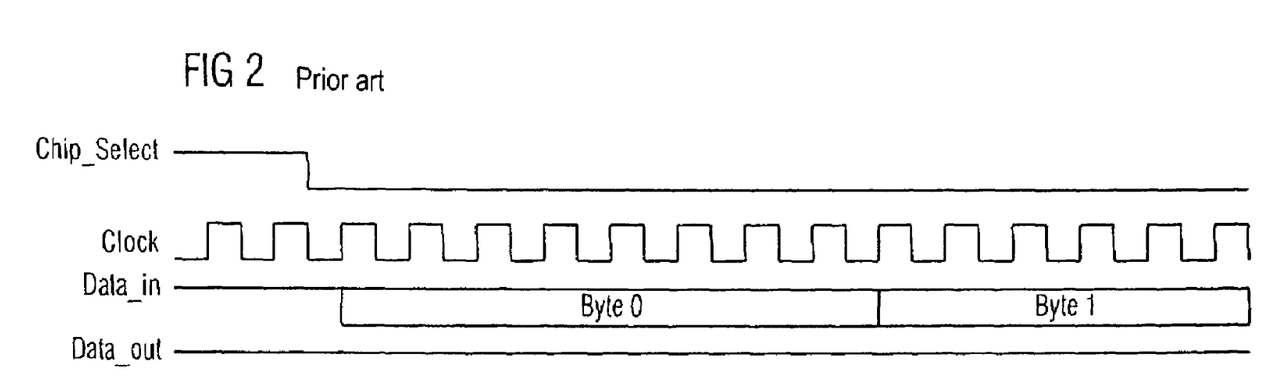
FIG. 2 shows a signal flow diagram for the data transmission in the circuit arrangement based on the prior art which is shown in FIG. 1.

FIG. 2 shows a timing diagram for the data transmission in the case of a serially controlled interface (SCI) in the circuit arrangement shown in FIG. 1.

A drawback of the circuit arrangement shown in FIG. 1 is that an independent chip select line or an additional address decoding circuit needs to be provided for every slave circuit. In addition, pull up resistors are necessary for the data output lines from the slave circuits.

Figure 3:
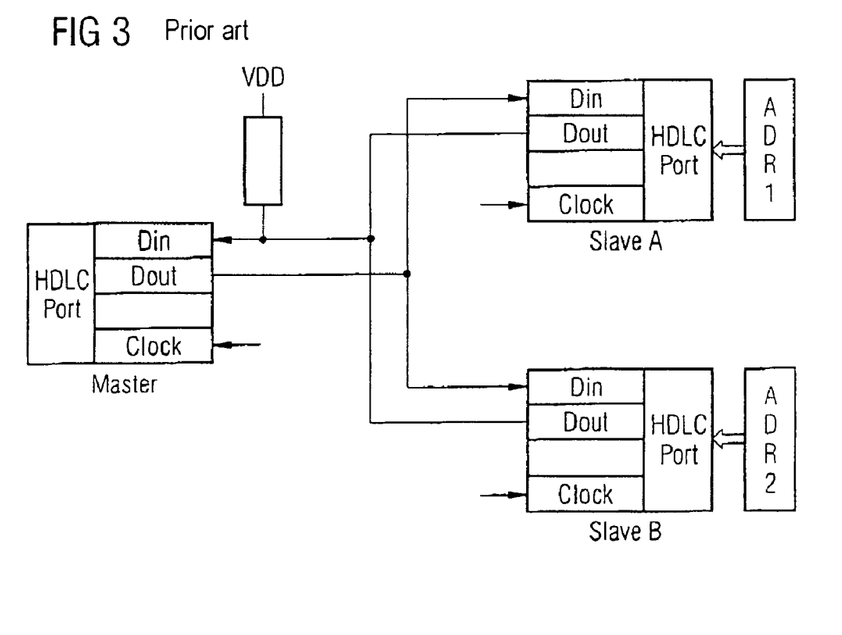
FIG. 3 shows another master/slave circuit arrangement based on the prior art.

For this reason, the circuit arrangement shown in FIG. 3 has been proposed, which dispenses with the chip select selection lines for actuating the slave circuits Slave A, Slave B. In the circuit arrangement shown in FIG. 3, the data output of the master circuit is connected by means of a first data bus or a first data line to all the slave circuits Slave A, Slave B connected in a star shape. In the same way, the data outputs $D_{out}$ of the slave circuits are connected to a data input ($D_{in}$) on the master circuit by means of a further data bus or data line. In the circuit arrangement shown in FIG. 3, the data are transmitted to the master circuit and to the slave circuits using data frames. The data frames can be transmitted from the master circuit to the slave circuit using any desired data transmission protocol, for example the HDLC data transmission protocol. The data frames contain administration data or header data and user data or payload data. The administration data comprise an address data field which is used to address the slave circuits Slave A, Slave B. In the circuit arrangement shown in FIG. 3, each slave circuit is connected to an associated, generally hardwired (pin strapped) address register in which the address of the slave circuit is stored. The slave circuit takes the data processing protocol as a basis for extracting the slave address contained in the transmitted data frame and compares said slave address with the slave circuit's hail address hardwired in the address register. If the two addresses are identical, then the slave circuit accepts the user data contained in the data frame for further data processing.

Figure 4:
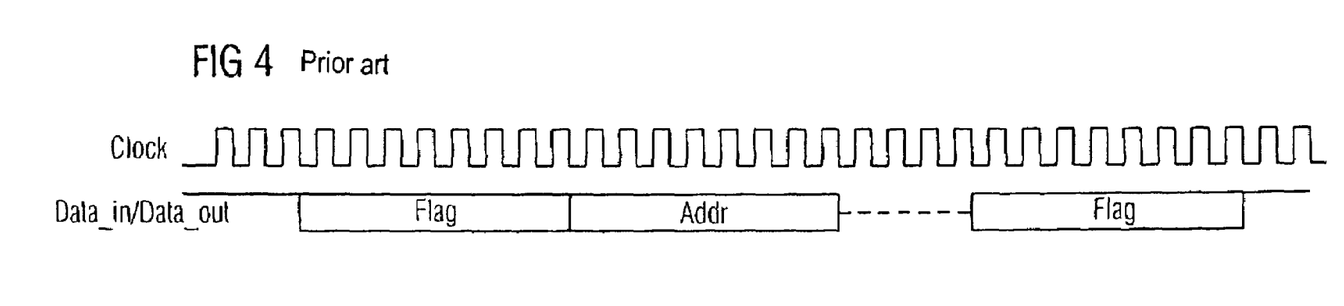
FIG. 4 shows a timing diagram for the data transmission in the circuit arrangement based on the prior art which is shown in FIG. 3.

FIG. 4 shows a timing diagram for the data transmission in the circuit arrangement shown in FIG. 3. The master circuit and the slave circuit are clocked by means of a common clock signal. The master circuit uses a flag byte, for example, to indicate the data transmission and selects the desired slave circuit using an address byte. The subsequent user data are processed by the selected slave circuit.

Figure 5:
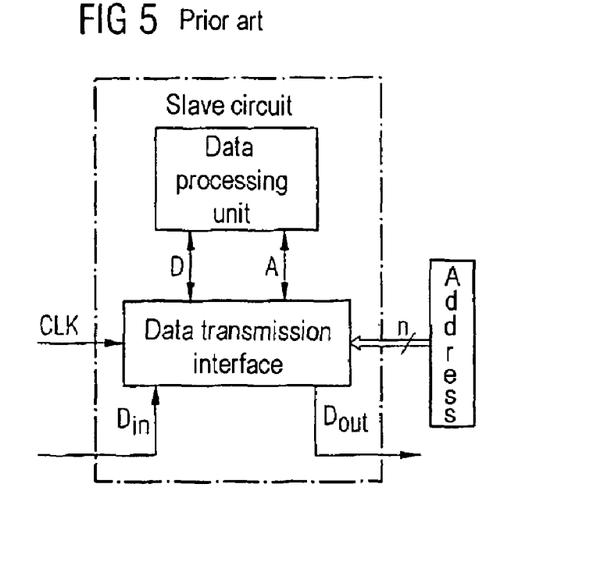
FIG. 5 shows a block diagram of a slave circuit based on the prior art.

FIG. 5 shows the circuit design of a slave circuit in the circuit arrangement shown in FIG. 3. The slave circuit essentially comprises a data transmission interface for receiving and sending data frames and also an internal data processing unit for processing the user data transmitted in the data frames. The address of the slave circuit is stored in a generally hardwired address memory. Alternatively, the address memory can also be programmable.

The drawback of the slave circuit shown in FIG. 5 is that the slave circuit requires at least 3+N connection pins when it is integrated on a chip, namely one connection pin for the clock signal (CLK), at least one connection for a data input line, at least one connection for a data output line and N connection lines for connection to the hardwired address register, if the address comprises N bits. The relatively large number of connection pins or connection pads complicates the miniaturization and integration of the slave circuit based on the prior art which is shown in FIG. 5.

SUMMARY OF INVENTION

It is therefore the object of the present invention to provide an initializable slave circuit which requires a minimal number of connection pins.

The invention achieves this object by means of a slave circuit having the features specified in patent claim 1.

The invention provides a slave circuit having a data transmission interface for transmitting data frames, an address register for storing an address, a comparator for comparing the address stored in the address register with an address transmitted to the data transmission interface in a data frame, and having an indicator register which indicates the initialization of the slave circuit if the address transmitted to the data transmission interface in the slave circuit is identical to a predetermined initialization address (UIA (UnInitialized Address)) for the slave circuit.

In one preferred embodiment of the inventive slave circuit, the data transmission interface has an external data input for receiving data frames from a master circuit, an external data output for sending data to the master circuit, an internal data output for sending the data extracted from the received data frame in line with a data transmission protocol to a data processing unit, an internal address output for sending an address extracted from the received data frame in line with the data transmission protocol to the data processing unit, and a clock signal input for receiving a clock signal.

The transmitted data frames preferably comprise at least a first data field for an address and
a second data field for transmitting data.

The address register in the slave circuit has preferably stored the initialization address prior to the initialization by the master circuit.

In one particularly preferred embodiment, the address register stores the data transmitted to the data transmission interface in the second data field of the data frame as a future address for the slave circuit if the address transmitted in the first data field of the data frame is identical to the predetermined initialization address.

The indicator register is preferably a flipflop which is actuated by the comparator.

The inventive slave circuit is preferably provided with an inhibit logic unit which inhibits the external data output of the data transmission interface if the indicator register indicates no initialization of the slave circuit.

In one preferred embodiment of the inventive slave circuit, the external data output is at logic high in an inactive state of the data transmission interface, and the indicator flipflop is likewise at logic high if the slave circuit has not been initialized.

In this particularly preferred embodiment, the inhibit logic unit comprises an OR gate, whose first input is connected to the external input of the data transmission interface and whose second input is connected to the indicator flipflop, and an AND gate, whose first input is connected to the output of the OR gate and whose second input is connected to the external data output of the data transmission interface.

In one particularly preferred embodiment of the inventive slave circuit, the inhibit logic unit has a synchronization flipflop connected downstream of it.

The inventive slave circuit is preferably connected in series with at least one further slave circuit, and the respective output of a synchronization flipflop in a slave circuit is connected to the external data input of the further slave circuit.

The series connected slave circuits are preferably connected to a master circuit in a ring structure, with the external data input of the first slave circuit being connected to a data output on the master circuit, and the output of the synchronization flipflop in the last slave circuit being connected to a data input on the master circuit.

The series connected slave circuits preferably have a common predetermined initialization address (UIA).

In one particularly preferred embodiment of the inventive slave circuit, the slave circuit is in the form of an integrated circuit having three connections, namely a first connection, which is connected to the external data input of the data transmission interface, a second connection, which is connected to the output of the synchronization flipflop, and a third connection, which is connected to the clock input of the data transmission interface and to the clock input of the synchronization flipflop.

The data transmission protocol for transmitting the data frames is preferably the HDLC protocol.

Another object of the invention is to provide a method for initializing slave circuits where the initialization can be performed with minimal circuit complexity.

The invention achieves this object by means of a method having the features specified in patent claim 16.

The invention provides a method for initializing slave circuits which are connected to a master circuit in a ring structure, where the master circuit sends initialization data frames, which each contain a common initialization address (UIA) stored in the slave circuits and an address assigned by the master circuit for the slave circuit, to the series connected slave circuits until the master circuit receives an initialization data frame which has been sent by itself.

In one preferred embodiment of the inventive initialization method, a slave circuit inhibits forwarding of a data frame to a downstream slave circuit until it is initialized by a received initialization data frame.

In one preferred embodiment of the inventive initialization method, a slave circuit, upon receiving an initialization data frame, stores the address contained in the initialization data frames as a future address for itself.

BRIEF DESCRIPTION OF THE DRAWINGS

Preferred embodiments of the inventive slave circuit and of the inventive initialization method are described below with reference to the appended figures in order to explain features which are fundamental to the invention.

In the figures.

DETAILED DESCRIPTION OF THE INVENTION

Figure 6:
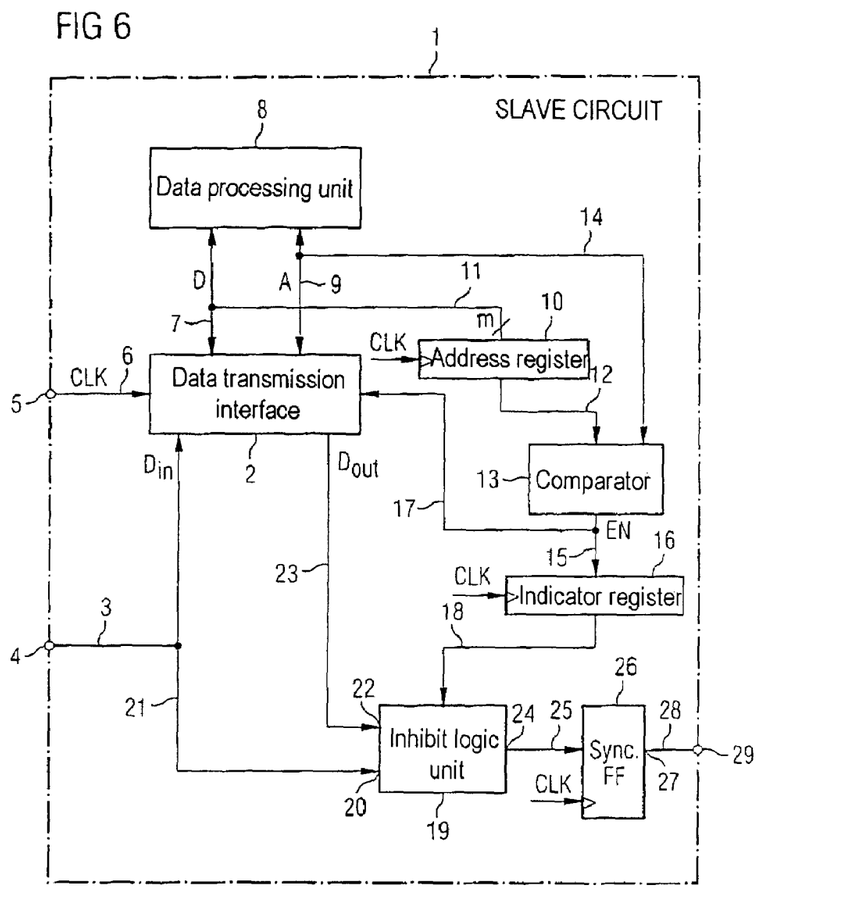
FIG. 6 shows a block diagram of a preferred embodiment of the inventive slave circuit.

As can be seen from FIG. 6, the inventive slave circuit 1 comprises a data transmission interface 2 which is connected to an external data input 4 by means of a data input line 3. The data transmission interface 2 receives, via the internal data line 3, the data frames received from a master circuit (not shown) at the external data input 4. The data transmission interface 2 is clocked using a clock signal which is applied to the data transmission interface 2 from an external clock signal input 5 via an internal clock line 6. The data transmission interface 2 processes the received data frames, which have the data structure shown in FIG. 7, for example, in line with a prescribed data transmission protocol, for example the HDLC data transmission protocol. The data transmission interface is connected to a data processing unit 8 in the slave circuit 1 by means of an internal data bus 7. In addition, the data transmission interface 2 is connected to the data processing unit 8 by means of an internal address bus 9.

The slave circuit 1 contains an address register 10. The address register 10 has stored a predetermined initialization address UIA prior to initialization of the slave circuit 1. In a preferred embodiment, this initialization address UIA is a common initialization address for a multiplicity of slave circuits 1 which can be connected in series. The address register 10 is connected to the internal data bus 7 by means of lines 11 and to a comparator 13 by means of lines 12. The bit width m of the address register corresponds to the bit width of the internal data bus 7. The comparator 13 has a further input, which is connected to the internal address bus 9 by means of lines 14. The comparator 13 compares the address stored in the address register 10 with the address which is present on the internal address bus 9. If the two addresses match, the comparator 13 uses an output and a line 15 to send an Enable signal, which is buffer-stored in an indicator register 16. The indicator register 16 is preferably an indicator flipflop. The Enable signal is also transmitted to the data transmission interface 2 via a line 17.

When the data transmission interface 2 receives a data frame from the master circuit via the data input 4, the address data contained in the data frame are extracted in line with the prescribed data transmission protocol and are applied to the internal address bus 9. Therefore, if the data transmission interface receives an initialization data frame whose address data field contains the predetermined initialization address UIA, the comparator 13 recognizes that the initialization address UIA stored in the address register 10 is identical to the address contained in the data frame, and generates an Enable signal. This Enable signal is buffer-stored in the indicator flipflop 16. The indicator signal indicates that the slave circuit 1 has been initialized. For this, the data transmission interface 2 extracts from the received initialization data frame the data which are contained in the user data field and stores these data as future address data for the slave circuit 1 in the address register 10. As a result, the address of the slave circuit 1 has been initialized for further operation.

The indicator flipflop 16 uses a control line 18 to actuate an inhibit logic unit 19 provided in the slave circuit 1. The inhibit logic unit 19 has a first input 20, which is connected to the external data input 4 of the slave circuit 1 by means of a line 21. The inhibit logic unit 19 also has a second input 22, which is connected to the data output of the data transmission interface 2 by means of a line 23. An output 24 on the inhibit logic unit 19 is connected by means of an internal line 25 to a downstream clocked synchronization flipflop 26 whose output 27 is connected to an external output 29 on the slave circuit 1 by means of an internal line 28.

The inhibit logic unit 19 inhibits the data output of the data transmission interface 2 if the indicator register 16 indicates that the slave circuit 1 has not yet been initialized. If the comparator 13 recognizes that the received data frame is an initialization data frame, i.e. that the address extracted from the data frame is identical to the initialization address UIA stored in the address register 10 beforehand, the indicator register 16 indicates initialization of the slave circuit 1 and deactivates the inhibit logic unit 19 using the control line 18.

As can be seen from FIG. 6, the inventive slave circuit 1 requires just three external connections, 4, 5, 29. The inventive slave circuit 1 can therefore be easily integrated, since it has few external connections.

Figure 7:
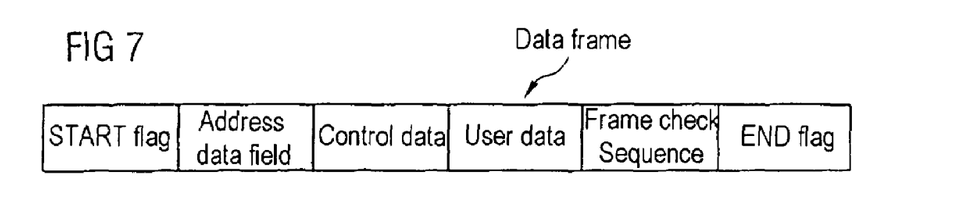
FIG. 7 shows a diagram to explain the structure of a data frame transmitted to the inventive slave circuit.

FIG. 7 shows a typical data structure for a data frame. The data frame comprises a start flag, which indicates to the slave circuit 1 that it is receiving a data frame. In normal operation, the address data field contains the hail address of the slave circuit 1. However, if the data frame is an initialization data frame, the address data field contains the initialization address UIA which is common to the slave circuit 1. The data frame comprises a further control data field, which contains various control bits, such as Read/Write. The data frame also comprises a user data field. In normal operation, the user data field contains the user data which are to be processed by the data processing unit 8 in the slave circuit 1. If the data frame is an initialization data frame, the user data field is used to indicate the future hail address of the slave circuit 1. The user data field is followed by a checking field and an end indicator flag.

In the original delivery state, the address register 10 in the slave circuit 1 stores a predetermined common initialization address UIA. If the slave circuit 1 receives the data frame shown in FIG. 7, which contains the initialization address UIA in the address data field and contains the future hail address of the slave circuit 1 in the user data field, the data transmission interface 2 extracts the initialization address UIA in line with the data transmission protocol and applies it to the internal address bus 9. As a result, the comparator 13 recognizes the initialization and indicates this to the inhibit logic unit 19 using the indicator register 16. As soon as the comparator 13 recognizes that the initialization data frame has been received, it actuates the data transmission interface 2, using the control line 17, such that it sends the address contained in the user data field via the internal data bus 7, this address being stored by the address register 10 for future addressing of the slave circuit 1.

Figure 8:
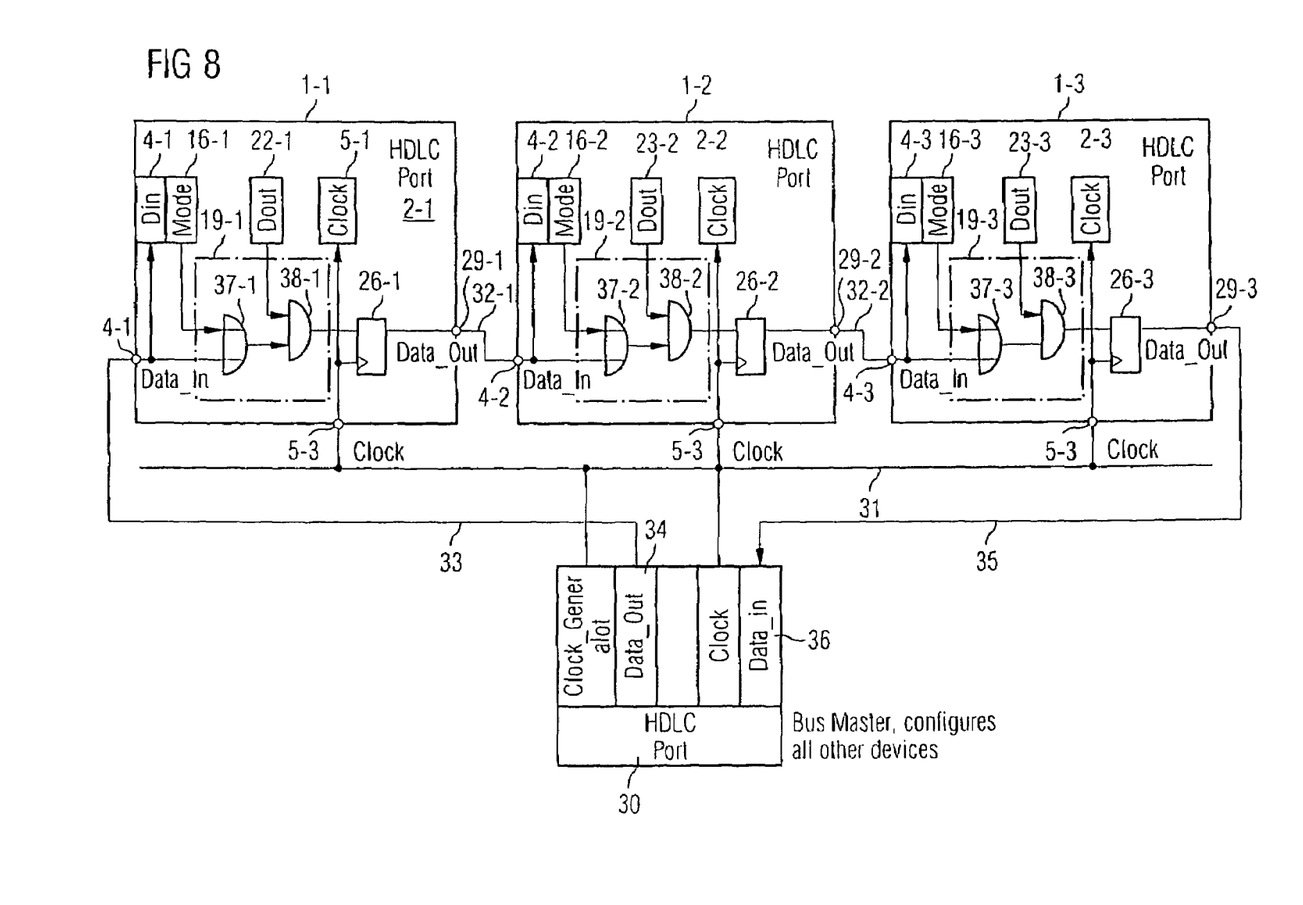
FIG. 8 shows a master/slave circuit arrangement based on the invention.

The inventive slave circuit 1, as shown in FIG. 6, is outstandingly suited to connection in series with further slave circuits designed in the same manner. FIG. 8 shows a master/slave circuit arrangement based on the invention, where three slave circuits 1, as shown in FIG. 6, are connected in series and form a ring structure together with a master circuit.

In the circuit arrangement shown in FIG. 8, the various slave circuits Slave 1-1, 1-2, 1-3 and the master circuit 30 are supplied with a clock signal via a common clock signal line 31. The data output 29-$i$ of a slave circuit 1-$i$ is connected to the data input 4-$i+1$ of the downstream slave circuit 1-(i+1) by means of a respective data line 32-$i$.

The external data input 4-1 of the external slave circuit 1-1 is connected to a data output 34 on the master circuit 30 by means of a data line 33. The data output 29-3 of the last series connected slave circuit 1-3 is connected to the data input 36 of the master circuit 30 by means of a data line 35.

In the circuit arrangement shown in FIG. 8, just three slave circuits 1 are connected in series. In an alternative embodiment, the number of series connected slave circuits 1-$i$ is much larger and, by way of example, is 256 series connected slave circuits 1-$i$. FIG. 8 shows a particular embodiment of the inhibit logic unit 19 provided in the slave circuit 1. The data output 23-$i$ of the HDLC data transmission interface 2-$i$ shown in FIG. 8 is at logic high in the inactive state of the data transmission interface. In addition, the indicator flipflop 16-$i$ is likewise at logic high if the comparator circuit 13 recognizes that no initialization has taken place yet.

In the preferred embodiment of the inhibit logic unit 19 shown in FIG. 8, the inhibit logic unit 19 comprises an OR gate 37 and a downstream AND gate 38. The OR gate has a first input, which is connected to the external input 4-$i$ of the data transmission interface and whose second input is connected to the indicator flipflop 16-$i$. The AND gate 38-$i$ in the inhibit logic unit 19-$i$ comprises a first input, which is connected to the output of the OR gate 37-$i$ and whose second input is connected to the data output 23-$i$ of the data transmission interface 2-$i$.

In the circuit arrangement shown in FIG. 8, the master circuit 30 and the series connected slave circuits 1 form a ring structure or a "daisy chain circuit". To initialize the series connected slave circuits 1, the master circuit 30 successively sends a plurality of initialization data frames via the data output 34 in the line 33 to the series connected slave circuits 1. The address data field of the first initialization data frame contains the common initialization address UIA, which is stored first in all the slave circuits, and, as user data, the future hail address of the first slave circuit 2-1. The slave circuit 2-1 recognizes the initialization data frame from the initialization address contained therein and stores the future hail address contained in the data frame in the address register 10. The indicator flipflop 16-1 in the first slave circuit 1 changes to logic 0, which means that the further data frames arriving at the data input 4-1 pass through the OR gate 37-1 to the AND gate 38-1. If one of the two data inputs on the AND gate 31-1 is at logic 0 and the output of the AND gate 38-1 is likewise at 0, the serially transmitted data bits of the data frames can pass via the synchronization flipflop 26-1 and the line 32-1 to the data input 4-2 of the next slave circuit 1-2. As soon as the first slave circuit 1-1 has been initialized, the next data frame which is sent by the master circuit via the line 33 can therefore reach the next series connected slave circuit 1-2. If the next data frame is likewise an initialization data frame, the next slave circuit 1-2 is initialized in the same way as the first slave circuit 1-2 and enables the data path to the downstream slave circuit 1-3 and so on. The initialization is continued until all the series connected slave circuits 1-i have been initialized and until the master circuit 30 itself receives an initialization data frame via the data line 35 and recognizes it as such. One advantage of the circuit arrangement as shown in FIG. 8 is that the master circuit 30 does not require any knowledge about the number of series connected slave circuits 1-i when initiating the initialization operation.

Figure 9:
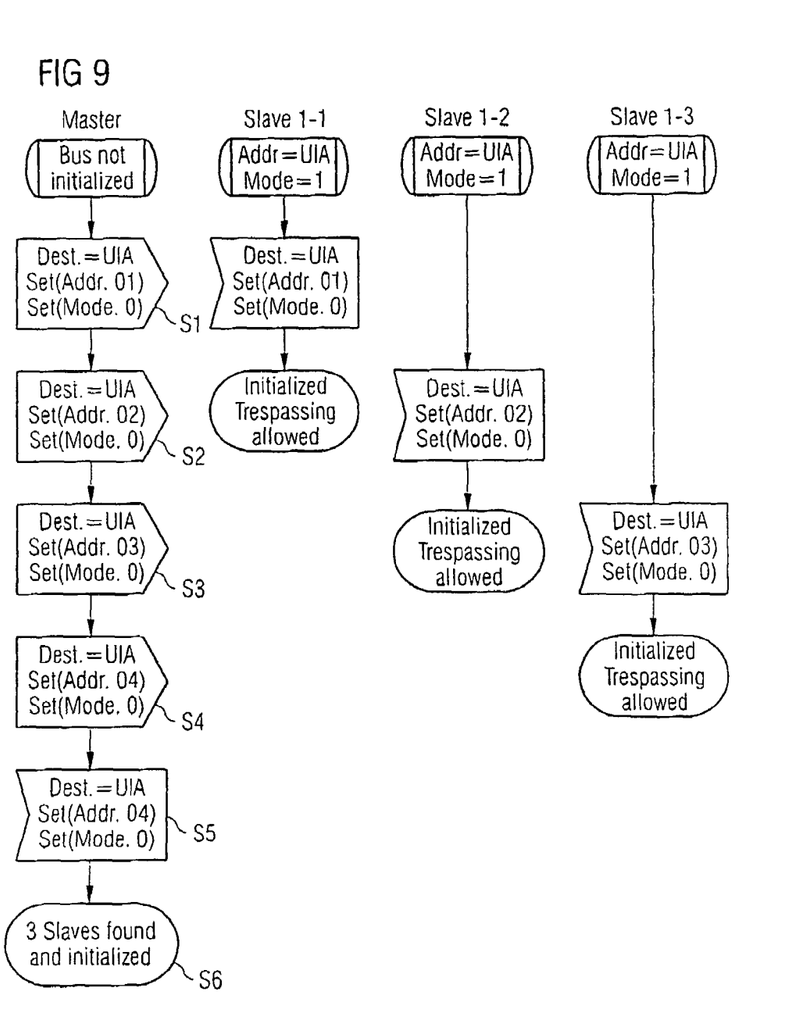
FIG. 9 shows flowcharts to explain the manner of operation of the inventive initialization method.

FIG. 9 shows a flowchart to explain the manner of operation of the inventive method for initializing slave circuits. The inventive method involves the master circuit 30 transmitting initialization data frames, which each contain a common initialization address UIA stored in the slave circuits 1-i and an address assigned by the master circuit for the slave circuit 1-i, to the series connected slave circuits until the master circuit 30 receives an initialization data frame which has been transmitted by itself.

In the case of the example shown in FIG. 9, the slave circuit 1-1 is assigned the address 01h, the slave circuit 1-2 is assigned the address 02h and the slave circuit 1-3 is assigned the address 03h by the master circuit 30. To this end, the master circuit 30 successively transmits three initialization data frames via the line 33 in steps S1, S2, S3.

The fourth initialization data frame, transmitted in step S4, is received by the master circuit 30 in unchanged form in step S5, which means that the initialization of the slave circuits from 1-1 to 1-3 is completed in step S6. The master circuit 30 then changes over to normal mode and sends data frames which contain the initialized addresses of the slave circuits and also user data.

One advantage of the circuit arrangement shown in FIG. 8 is that no pull up resistors are necessary. This allows higher data transmission rates, for example up to 30 MHz for slave circuits having 3.3 V TTL compatible connection pads. The number of slave circuits which can be connected in series is unlimited in principle and is determined by the number of address bits in the address field of the data frame. The number of pads per slave circuit 1-i is just three, which means that the slave circuits 1-i can easily be integrated.

What is claimed is:

1. Slave circuit which can be connected in series with further slave circuits and a master circuit to form a ring structure, having:
    (a) a data transmission interface for processing data frames which are received from the master circuit, where the data transmission interface has an external data input for receiving the data frames from the master circuit and a data output for sending data frames to the next series connected slave circuit, where each data frame contains at least a first data field for an address and a second data field for transmitting user data;
    (b) an address register for storing an address, where the address register has stored, prior to the initialization of the slave circuit by the master circuit, a predetermined initialization address which is provided for all the slave circuits jointly;
    (c) a comparator for comparing the address stored in the address register with an address received from the data transmission interface in a data frame, where the address register stores the data transmitted in the second data field of the data frame as a future address for the slave circuit if the address transmitted in the first data field of the data frame is identical to the predetermined initialization address;
    (d) an indicator register which indicates the initialization of the slave circuit if the address received by the data transmission interface in the slave circuit is identical to the predetermined initialization address; and having
    (e) an inhibit logic unit which inhibits the data output of the data transmission interface until the indicator register indicates initialization of the slave circuit.

2. Slave circuit according to claim 1, wherein the data transmission interface has a data output for sending data, an internal data output for sending the data extracted from the received data frame in line with a data transmission protocol to a data processing unit, an internal address output for sending the address extracted from the received data frame in line with the data transmission protocol to the data processing unit, and a clock signal input for receiving a clock signal.

3. Slave circuit according to claim 1, wherein the indicator register is a flipflop which is actuated by the comparator.

4. Slave circuit according to claim 1, wherein the data output is at logic high in the inactive state of the data transmission interface, and in that the indicator flipflop is at logic high if the slave circuit has not been initialized.

5. Slave circuit according to claim 4, wherein the inhibit logic unit has:
    (a) an OR gate, whose first input is connected to the external data input of the data transmission interface and whose second input is connected to the indicator flipflop, and
    (b) an AND gate, whose first input is connected to the output of the OR gate and whose second input is connected to the data output of the data transmission interface.

6. Slave circuit according to claim 1, wherein the inhibit logic unit has a synchronization flipflop connected downstream of it.

7. Slave circuit according to claim 6, wherein when the slave circuit is connected in series with a further slave circuit the respective output of the synchronization flipflop in a slave circuit is connected to the external data input of the further downstream slave circuit.

8. Slave circuit according to claim 7, wherein when the slave circuits are connected in series with the master circuit to form a ring structure the external data input in the first slave circuit is connected to a data output on the master circuit, and the output of the synchronization flipflop in the last slave circuit is connected to a data input on the master circuit.

9. Slave circuit according to claim 1, wherein the slave circuit is an integrated circuit having three connections, namely a first connection, which is connected to the data input of the data transmission interface, a second connection, which is connected to the output of the synchronization flipflop, and a third connection, which is connected to the clock input of the data transmission interface and to the clock input of the synchronization flipflop.

10. Slave circuit according to claim 1, wherein the data transmission protocol for processing the transmitted data frames is an HDLC protocol.

* * * * *